US008253621B1

(12) United States Patent
Friesel

(10) Patent No.: US 8,253,621 B1
(45) Date of Patent: *Aug. 28, 2012

(54) METHOD FOR SCANNING A RADAR SEARCH VOLUME AND CORRECTING FOR ROTATION OF COVARIANCE ELLIPSE

(75) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 362 days.

This patent is subject to a terminal disclaimer.

(21) Appl. No.: 12/466,925

(22) Filed: May 15, 2009

(51) Int. Cl.
*G01S 13/00* (2006.01)
(52) U.S. Cl. ............... 342/95; 342/147; 342/165
(58) Field of Classification Search ........... 342/147–158
See application file for complete search history.

(56) References Cited

U.S. PATENT DOCUMENTS

| | | | |
|---|---|---|---|
| 4,467,447 A | 8/1984 | Takahashi et al. | |
| 5,890,012 A | 3/1999 | Poisner | |
| 7,184,036 B2 * | 2/2007 | Dimsdale et al. | 345/419 |
| 7,221,307 B1 | 5/2007 | Friesel | |
| 2006/0202886 A1 | 9/2006 | Mahapatra et al. | |
| 2007/0018882 A1 | 1/2007 | Manoogian et al. | |
| 2008/0153414 A1 | 6/2008 | Ho et al. | |
| 2008/0210016 A1 | 9/2008 | Zwirn et al. | |

OTHER PUBLICATIONS

Eberly, D., "Perspective Projection of an Ellipsoid", Geometric Tools, LLC, http://www.geometrictools, com, Created: Mar. 2, 1999, last Modified: Mar. 1, 2008.
U.S. Appl. No. 12/208,588, filed Sep. 11, 2008, entitled "Method for Scanning a Radar Search Volume Within an Allowable Scan Time", in the name of Friesel.
U.S. Appl. No. 12/879,374, filed Sep. 10, 2010, entitled "Method and System for Scanning a Radar Search Volume and Correcting for 3D Orientation of Covariance Ellipsoid".
U.S. Appl. No. 12/885,663, filed Sep. 20, 2010, entitled "Methods and Systems for Partitioning a Radar Acquisition Volume".
U.S. Appl. No. 12/906,566, filed Oct. 18, 2010, entitled "Method and System for Azimuthal Containment Using Largest Gap Method".

* cited by examiner

*Primary Examiner* — Timothy A Brainard
(74) *Attorney, Agent, or Firm* — Howard IP Law Group, P.C.

(57) ABSTRACT

A radar volume in a cued direction is searched with sequential pencil beams. The cued direction is subject to uncertainty in the form of covariance. The covariance defines an ellipse rotated relative to the azimuth axis. Before determining the extent of the acquisition face, the ellipse is projected onto a viewplane normal to the radar range axis, and rotated so the principal axes are parallel with the traverse and elevation directions. The acquisition face is then found. The number of beams required to scan the search volume is determined. In one embodiment, the search volume is sent to the radar, and the radar rotates the beams to their correct positions. The beams are then scheduled.

19 Claims, 10 Drawing Sheets

METHOD FOR SCANNING A RADAR SEARCH VOLUME AND CORRECTING FOR ROTATION OF COVARIANCE ELLIPSE

BACKGROUND OF THE INVENTION

SPY is a naval radar system which searches space under control of command and decision processing. It searches by means of a plurality of sequential directional beams which may be pointed in a given direction. Command and Decision determines the acquisition face (volume) to be searched. The radar beam is directed to each angle so as to cover the entire search face. This type of searching is subject to time constraints, as the beam must dwell at the current beam angle for a sufficient time for the transmitted radar signals or pulses to travel to the target, which might be at the maximum allowable range, and for the reflection to return to the radar. The round-trip time is the well-known 12.4 microseconds per nautical mile of target range. Thus, the beam must dwell at each angle of the search face for a sufficient length of time to detect a target at the maximum range, and then move on to the next angle within the search beam pattern.

Because of the need to keep the radar system in use, as when searching multiple volumes in the case of multiple potential targets, it is necessary to limit the amount of time spent searching a given volume. The system aborts the search of a volume of space after a given time. Consequently, a search through a volume of space may be initiated and aborted without being completed. This operation may result in a failure to locate a target within the specified scan volume. In order to avoid having a scan aborted and the resulting problems, it is imperative that the searching of any given volume be performed in the least possible time.

The Spy radar can operate in a volume search mode. When information becomes available from another source, such as a cooperating radar, about the possible presence of a target in a nominal given direction or location, it may be desired to examine a volume about the nominal given direction in an attempt to acquire the target. This is termed a "cued" search. If the selected volume is too large, the search may time-out before completion of the search, and if too small, may not find the relevant target(s).

Improved or alternative arrangements for establishing the angular extent of the search volume about the cued nominal direction of a target to guarantee that the search can be accomplished within given time constraints are described in copending U.S. patent application Ser. No. 12/208,588, filed Sep. 11, 2008 (GE-07387) in the name of Friesel.

In general, the method as described by Friesel is for searching an angular region of the radar acquisition or search volume about a given cued direction and with a given maximum search range. The radar search of the designated volume is performed with sequentially generated radar beams having defined beamwidths. The method comprises the steps of acquiring the nominal track position and velocity (cue information) and time, and error information describing the uncertainty in the cue information. This error information may be presented together with the cue information. From the error information, the azimuth and elevation extent (the acquisition or search face) of the search volume about the cue direction is determined. If necessary, the angular extent of each beam in the azimuth and elevation directions are determined from the beamwidths. From the angular extents in azimuth and elevation for each beam, the number of beams required to cover the acquisition face is determined [equation 1]. The dwell time for each of the beams is determined from the search range. The search time is determined as the product of the number of beams multiplied by the dwell time per beam. The search time is compared with the maximum allowable search time, and radar scanning over the acquisition face is initiated with the calculated number of beams if the search time is less than the maximum allowable search time. The acquisition or search face is partitioned into sub-search-faces if the search time is greater than the maximum allowable search time. Sequential radar scanning of each of the sub-search-faces is initiated. In a preferred mode of the method, the number of beams N is calculated as $$N = \left[1 + 2flr\left(\left(\frac{A_{ext}}{2\Delta A}\right) + \left(\frac{1}{2}\right)\right)\right]\left[1 + 2flr\left(\left(\frac{E_{ext}}{2\Delta E}\right) + \left(\frac{1}{2}\right)\right)\right] + 4\left[1 + flr\left(\frac{A_{ext}}{2\Delta A}\right)\right]\left[1 + flr\left(\frac{E_{ext}}{2\Delta E}\right)\right] \quad (1)$$

where:
$A_{ext}$ is half the total azimuth extent of the search face;
$E_{ext}$ is half the total elevation extent of the search face;
$\Delta A$ is the azimuthal beam separation at constant elevation;
$\Delta A = (\beta/2)\cos\alpha$, where $\beta$ is the beam width and $\alpha$ is derived from the beam placement pattern, and is typically equal to 30 degrees. More specifically, $\alpha$ is equal to ½ the acute angle between the two lines that extend from the center of a radar beam to the points of intersection of the circumference of the beam with the circumference of an adjacent beam;
$\Delta E$ is the elevation separation of the line of centers of the horizontal rows;
$\Delta E = \beta/2)(1+\sin\alpha)$; and
flr is a floor function that truncates the argument to the highest integer less than the argument.

Prior arrangements for determining the number of beams required in a fixed pattern about the cued direction have tended to give numbers that, in some cases, were greater than desired. As a result, the cued searching of the radar in these cases might exceed the maximum search time, thereby causing the search to be aborted.

In the scenario 10 of FIG. 1, a line 12 defines the horizon. A ship (ownship) 14 carries a radar system, portions of which are illustrated as 16. A target 20 is at a distance from ownship 14, and is observed along a line-of-sight 24 by means of sensors (not separately illustrated) mounted on a ship 22. Ship 22 obtains information about the location of target 20. Since ship 14 (and possibly other ships and assets associated with ship 22) may not be aware of the presence of target 20, ship 22 transmits coordinates of the target to other assets and in particular to ship 14. This transmission may be made by any communication path, such as, for example, the uplink 30U and downlink 30D associated with a communication spacecraft 32. Processing aboard ship 22 may evaluate the quality of the target track, and transmit target track quality in the form of a covariance matrix or other error information together with the target coordinates.

In FIG. 2, ship 14 includes a communication antenna 212 which is intended for communication with other assets, including the communication represented in FIG. 1 by path 30D. This communication, including information relating to the location of target 20 and the errors associated with the location, is coupled to a command and decision function, illustrated as a block 216. Block 216 of ship 14 processes the target location information from ship 22 of FIG. 1, and from this location information determines the target azimuth and elevation angle relative to ownship 14, and the azimuth and elevation extent of the search or acquisition face required to acquire the target with its own sensors.

The target azimuth and elevation relative to ownship 14 of FIG. 2, and the azimuth and elevation extent of the acquisition face (see FIG. 3A) required by the errors in target azimuth and elevation, are transmitted from Command and Decision block 216 to an ownship radar beam control illustrated as a block 218. Radar beam control 218 commands the generation of transmit and receive beams by antenna face 220. These beams are "pencil" or narrow beams, as known in the art. A representative pencil beam is illustrated as 222. Radar beam control 218 may also receive commands from other functional modes, such as wide-area search modes, illustrated together as a block 224.

The radar beam controller 218 of FIG. 2, together with the antenna face 220, produces sequential pencil beams in directions which, in conjunction with other pencil beams, suitably search the volume of space defined by the combination of an acquisition face in conjunction with the desired range.

FIG. 3A is a representation of a search or acquisition face 310 defined by sequential beam generation by the radar sensor 16 of FIG. 2. The azimuth and elevation directions are indicated by arrows. In FIG. 3A, the nominal target azimuth and elevation, as specified by the target azimuth and elevation angle relative to ownship 14 generated by block 216, appears as a + symbol at the center of the acquisition face 310. A "cross-section" of each pencil beam is illustrated as a circle. Representative circles are designated by the number 320. The pencil beams are directed so that the beams overlap at a given power level. This overlap is indicated in FIG. 3A by the overlap of the circles. Those skilled in the art will understand that the "magnitude" of the overlap depends upon the "beamwidth" of the beams, the relative placement of the beam centers by the radar, and the attenuation or "signal" level at the overlap. Also in FIG. 3A, the overlapping beams provide coverage of a region defined by a rectangular outline 312. The azimuth "extent" of the coverage region is defined by the arrow designated $A_{ext}$, extending in the horizontal direction from a vertical centerline 314 to the outline 312. The elevation "extent" of the coverage region is defined by the arrow designated $E_{ext}$, extending in the elevation or vertical direction from a horizontal centerline 316 to the outline 312.

It should be understood that the number of pencil beams can be selected somewhat arbitrarily, in order to cover the desired acquisition face. That is, due to unavoidable errors in determining the exact location of the target, and due to errors in determining the direction in ownship local coordinates, the target may not be found at the precise specified cue coordinates. In order to acquire and track the target with ownship radar, it is desirable to search a region or extent about the nominal target local coordinates. Thus, the search or acquisition face to be searched by ownship radar to acquire target 20 is defined by the reported coordinates as converted to local (ownship) coordinates, and further as affected by the reported errors accompanying the target coordinates. Thus, the extent ($A_{ext}$ and $B_{ext}$) will in general be different for each cued target.

The SPY radar places an initial search beam designated 312C dead-center in the acquisition face, indicated in FIG. 3A by "+". Subsequent beams are placed to produce a regular pattern of partially overlapping beams that completely covers the acquisition face. The pattern may be described in a number of ways. One way of describing the pattern is as a line of equally spaced beam centers extending azimuthally to the edge of the search region. The line at elevation center (the line containing "+") contains the initial beam 312C and always has an odd number of beams. The azimuthal beam center separation is $2\Delta A$ where $\Delta A = (\beta/2)\cos\alpha$, where $\beta$ is the beam width and $\alpha$ is derived from the beam placement pattern, and is typically equal to 30 degrees. More specifically, $\alpha$ is equal to ½ the acute angle between the two lines that extend from the center of a radar beam to the points of intersection of the circumference of the beam with the circumference of an adjacent beam. The relationship is explained further in conjunction with FIG. 6. In FIG. 6, $\beta$ is indicated by the diameter of the beam 610 and the intersection of beam 610 with adjacent beam 612 is identified as points 614 and 616. The angle subtended between lines 618 and 620 extending from beam center 610C to points 614 and 616, respectively, is $2\alpha$. Angle $\alpha$ is an angular measure, often given in degrees. The relationship of the search or acquisition face to the overall search volume associated with the face is illustrated in FIG. 3B. In FIG. 3B, the search face is designated as 310, and the range provides a third dimension which defines the search volume.

As described in the Friesel application, the azimuth extent $A_{ext}$ about the cued direction is increased or extended over and above that required by noise or errors to $A_{ext}+\Delta A$ in order to accommodate edge search, and the elevation extent $E_{ext}$ is increased or extended to $E_{ext}+\Delta E$, as illustrated in FIG. 4. A beam is "counted" as being in the search face if its center falls within the extended azimuth and elevation ranges. Clearly, if $$(A_{ext}+\Delta A)/2\Delta A < 1 \qquad (2)$$

there is only one search beam on the azimuth line. In this case, the number of beams in a line in the azimuth direction is one. This can only occur in the rows at elevation center, and in alternate rows above and below that at elevation center. It should be noted that a column of single beams is triggered by an azimuth threshold—a special case addressed using independent processing, not described herein and of no relevance to the invention. If $$1 \leq (A_{ext}+\Delta A)/(2\Delta A) < 2 \qquad (3)$$

there are $2*1+1=3$ beams, because one beam is added on each side of center.

By extension, letting parameter $n_A=0, 1, \ldots$, there are $2n_A+1$ beams in the line if $$n_A \leq (A_{ext}+\Delta A)/(2\Delta A) < n_A+1 \qquad (4)$$

The corresponding functional equation, that can be used to compute the number of beams in selected horizontal lines for any azimuth extent, is given by $$2n_A + 1 = 1 + 2flr\left[\frac{A_{ext}+\Delta A}{2\Delta A}\right] = 1 + 2flr\left[\frac{A_{ext}}{2\Delta A}+\frac{1}{2}\right] \qquad (5)$$

where:
the floor (flr) function truncates the argument to the highest integer less than the argument; and
$\Delta A$ is the spacing between beams in the azimuth direction.

For all remaining horizontal beam lines, e.g. those centered at $\pm\Delta E, \pm 3\Delta E, \ldots$, of FIG. 4, the number of beams is $2 m_A$. The horizontal line of beams located $\Delta E$ above the line at elevation center in FIG. 4 has beam centers at $(1+2m_A)\Delta A$ to $A_{ext}+4\Delta A$ for $m_A=1, 2, \ldots$. Consequently, the number of beam positions in this line is always even. There are $2m_A$ beams in the line if $$m_A \leq (A_{ext}+2\Delta A)/2\Delta A < m_A+1 \qquad (6)$$

The azimuth extension $\Delta A$ provides assurance that there will be beam centers at least at $+\Delta A$ corresponding to $m_A=1$. Since all arguments are positive, the corresponding functional representation of the beam count and conditions is $$2m_A = 2flr\left(\frac{A_{ext} + 2\Delta A}{2\Delta A}\right) = 2\left[1 + flr\left(\frac{A_{ext}}{2\Delta A}\right)\right] \quad (7)$$

Equations (5) and (7) hold also in elevation, with the simple change of $E_{ext}$ and $\Delta E$ replacing $A_{ext}$ and $\Delta A$, respectively. Thus, in elevation, $$2n_E + 1 = 1 + 2flr\left[\frac{E_{ext} + \Delta E}{2\Delta E}\right] = 1 + 2flr\left[\frac{E_{ext}}{2\Delta E} + \frac{1}{2}\right] \quad (8)$$

and $$2m_E = 2flr\left[\frac{E_{ext} + 2\Delta E}{2\Delta E}\right] = 2\left[1 + flr\left(\frac{E_{ext}}{2\Delta E}\right)\right] \quad (9)$$

The number of beam positions in odd and even elevation columns or "lines" is given by $2n_E+1$ and $2m_E$, respectively. It can easily be seen from FIG. 4 that the number of azimuth lines with an odd number of beam positions is the number of beam positions in an odd-number elevation line. Similarly, the number of azimuth lines with an even number of beam positions is the number of beam positions in an even-numbered elevation line. The total number of beam positions is therefore $$N=(2n_A+1)(2n_E+1)+(2m_A)(2m_E) \quad (10)$$

As described in the Friesel application, the number N of beams required to cover the acquisition face is given by $$N = \left[1 + 2flr\left(\left(\frac{A_{ext}}{2\Delta A}\right) + \left(\frac{1}{2}\right)\right)\right]\left[1 + 2flr\left(\left(\frac{E_{ext}}{2\Delta E}\right) + \left(\frac{1}{2}\right)\right)\right] + 4\left[1 + flr\left(\frac{A_{ext}}{2\Delta A}\right)\right]\left[1 + flr\left(\frac{E_{ext}}{2\Delta E}\right)\right] \quad (1)$$

where:
$A_{ext}$ is half the total azimuth extent of the search face;
$E_{ext}$ is half the total elevation extent of the search face;
$\Delta A$ is the azimuth separation of the line of centers of adjacent horizontal columns;
$\Delta E$ is the elevation separation of the line of centers of adjacent horizontal rows;
$\Delta E=(\beta/2)(1+\sin \alpha)$;
flr is a floor function that truncates the argument to the highest integer less than the argument; and
$\Delta A=(R/2)\cos \alpha$, where $\beta$ is the beam width of a single beam and $\alpha$ is equal to ½ the acute angle between the two lines that extend from the center of a radar beam to the points of intersection of the circumference of the beam with the circumference of an adjacent beam. In FIG. 6, $\beta$ is indicated by the diameter of the beam 610 and the intersection of beam 610 with adjacent beam 612 is identified as points 614 and 616. The angle subtended between lines 618 and 620 extending from beam center 610C to points 614 and 616, respectively, is $2\alpha$.

As mentioned, $\Delta A$ is the azimuthal (horizontal) distance between beam centers of adjacent beam columns, that is, between the center of a beam and the center of the adjacent beam in the row above or below, and not between beam centers in a given row. Similarly, $\Delta E$ is the elevation (vertical) distance between beam centers of adjacent rows, i.e. between the center of a beam and the center of the adjacent beam in the row above or below it. In the representative acquisition face of FIG. 4, the azimuth extent is $7\Delta A+\delta$ where $\delta<\Delta A$, and the elevation extent is $2\Delta E+\epsilon$, where $\epsilon<\Delta E$. Substitution into equation (1) gives $$N=[1+2*4]*[1+2*1]+4*[1+3][1+1]=9*3+4*4*2=59$$

As can be observed by counting beams in FIG. 4, the calculated number of beams matches the actual number in the example.

FIG. 5 is a simplified logic or functional flow chart or diagram 500 illustrating a method according to the Friesel application. In FIG. 5, logic 500 begins at a START block 510, and the logic flows to a block 512. Block 512 represents acquisition of cued target information, together with error information. This may be accomplished as described in conjunction with FIG. 1. From block 512 of FIG. 5, the logic flows to a block 514, which represents determination from the cue information of the location of the target relative to own-ship, and calculation of the azimuth and elevation extent of the acquisition face. Block 516 represents the calculation of the number of beams required to fill the acquisition face, using equation (1). It is not enough to determine the number of beams in the search region. As mentioned, it is necessary to determine the time required to accomplish the search, taking into account the number of beams and the range. The range of the search volume is determined in block 518 in order to estimate search time per beam, as known in the art. Command and decision block 216 of FIG. 2 multiplies the range-dependent time with (or by) the number of beams, as suggested by block 520 of FIG. 5, and arrives at a scan or search time for the number of beams associated with the acquisition face.

Block 522 of FIG. 5 represents the comparison of the scan or search time ST with the maximum allowable time MT. The maximum allowable time MT is that time at which the search aborts. A decision block 524 evaluates the comparison, ST>MT. The logic leaves decision block 524 by the NO output if the scan time is less than the maximum time, and flows to a block 526. Block 526 represents the searching of the full extent. Once the search of the full extent has begun, the logic can return by a logic path 527 from block 526 to block 512 to acquire new cue information for processing during the next scan.

If decision block 524 finds that the scan of the full extent will exceed the maximum time, the logic leaves the decision block by the YES output, and flows to a further block 528.

Block 528 creates a modified search volume, by calculating a maximum search elevation such that the search time of this modified volume will be less than or equal to the maximum search time. The number of beams is not used to calculate the modified search volume. The new extent $E_{ext\_new}$ is found from (ST/MT)times $E_{ext}$, where ST is the search time of the unmodified volume, $E_{ext}$ is the extent of the unmodified acquisition face, and MT is the maximum allowed search time. From block 528, the logic 500 of FIG. 5 flows to a block 530. The elevation center of the modified acquisition face is calculated as the unmodified minimum elevation plus $E_{ext\_new}$. The logic then leaves block 530 and enters block 526, where the modified acquisition volume is searched. The logic then leaves block 526 and re-enters block 514. In block 514 the unmodified acquisition volume is updated to the current time, and re-calculated. The minimum elevation of the recalculated volume is replaced with the maximum elevation of the previous modified volume. The logic then leaves block 514 and enters block 516 to begin another iteration from block 514 through 526. These iterations continue until the entire unmodified volume is searched.

SUMMARY OF THE INVENTION

A method according to an aspect of the invention is for searching an angular region of the radar acquisition or search volume about a given cued direction and with a maximum range, where the radar search of the designated volume is performed with sequentially applied radar beams having defined beamwidths from a planar radar face. The method comprises the steps of acquiring error information relating to the cued direction and, from the error information, determining the azimuth and elevation extent of the search volume about the cue direction. The angular extent of each beam in azimuth and elevation is determined. From the angular extents in azimuth and elevation for each beam, the number of beams required to cover the acquisition face of the search volume is determined. Dwell time for each of the beams is determined, given the search range. The product is taken of the number of beams multiplied by the dwell time per beam to thereby establish a search time, and the search time is compared with a maximum allowable search time. Radar scanning is initiated over the acquisition face with the calculated number of beams if the search time is less that the maximum allowable search time. Otherwise the search face is partitioned into sub-search-faces if the search time is greater than the maximum allowable search time, and for each of the sub-search-faces, radar scanning is initiated. The step of determining the azimuth and elevation extent of the search volume about the cue direction includes the step of projecting the covariance onto the viewplane normal to the radar range vector, and rotating it such that the principal axes of the projected covariance align with the traverse/elevation axes of the viewplane. The step of initiating radar scanning over the acquisition face with the calculated number of beams if the search time is less that the maximum allowable search time may include the step of rotating the position of each beam back through the rotation angle prior to scheduling. Partitions may be treated in a similar fashion, after determining a partition in the rotated projection.

DESCRIPTION OF THE INVENTION

Figure 7A:
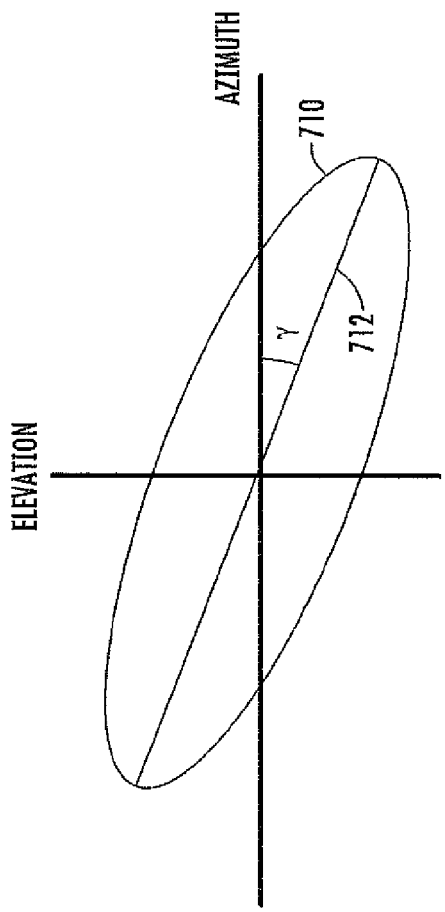
FIG. 7A is a representation of an ellipse in which the major axis is rotated away from the azimuth axis.
Figure 7B:
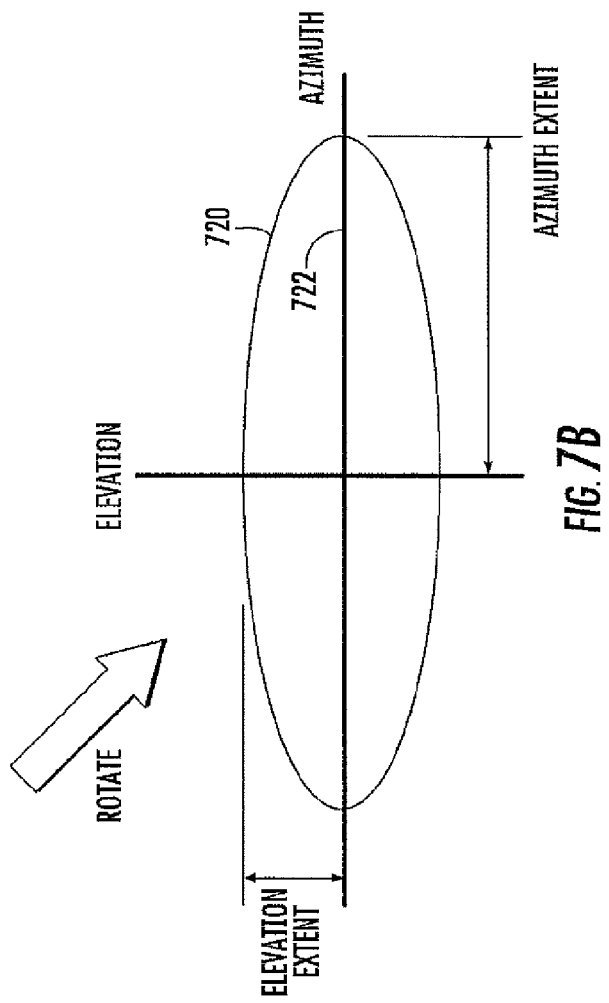
FIG. 7B is a representation of the ellipse of FIG. 7A rotated so that the major axis is parallel with the azimuth axis.
Figure 8:
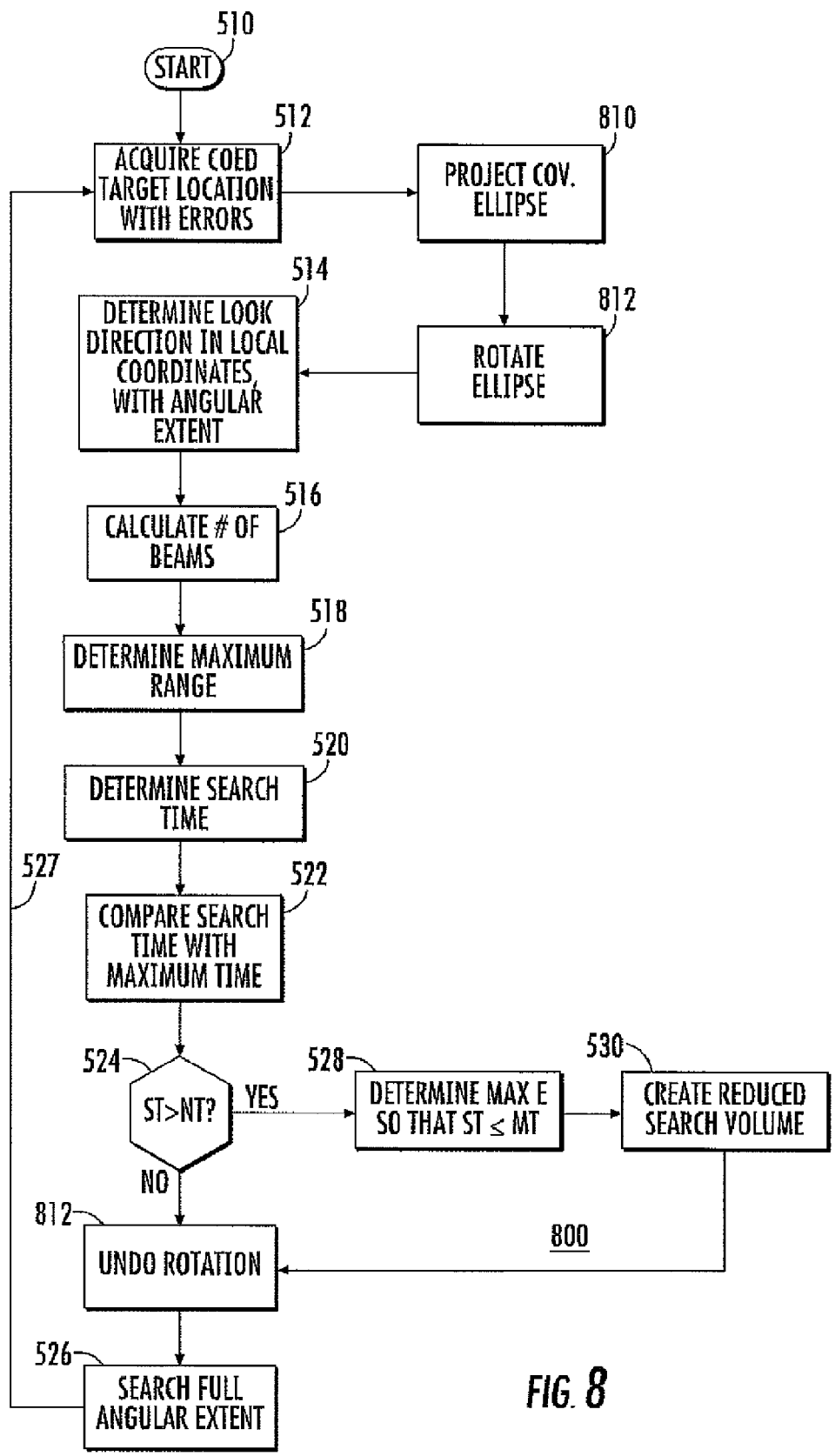
FIG. 8 is a logic diagram generally similar to FIG. 5, but including steps in accordance with aspects of the invention.

As noted above, the information relating to the cue direction toward which the radar is to be directed includes direction and error or covariance information. FIG. 7A is a representation of covariance information in the form of an ellipse 710. In general, the major axis 712 of ellipse 710 is displaced by an angle γ from the azimuth axis. This angular displacement results from the viewing angle of the ship receiving the cue relative to that of the ship providing the cue. If the azimuth and elevation extents are determined from the rotated covariance ellipse, the azimuth and elevation extents of the scan face may not cover the entire region in which the target may be found. In FIG. 7B, the covariance ellipse 720 has been rotated so that its major axis 722 is coincident with or parallel to the azimuth axis. FIG. 8 is a simplified logic or control flow chart or diagram 800 which is generally similar to the logic 500 of FIG. 5, but which includes additional steps according to aspects of the invention, for at least rotating the covariance ellipse before calculation of the azimuth and elevation extents.

Following the acquisition of the cued direction and the errors or covariance in block 512, the logic 800 flows to new block 812. Block 812 represents rotation of the covariance ellipse, as described in conjunction with FIGS. 7A and 7B.

Figure 2:
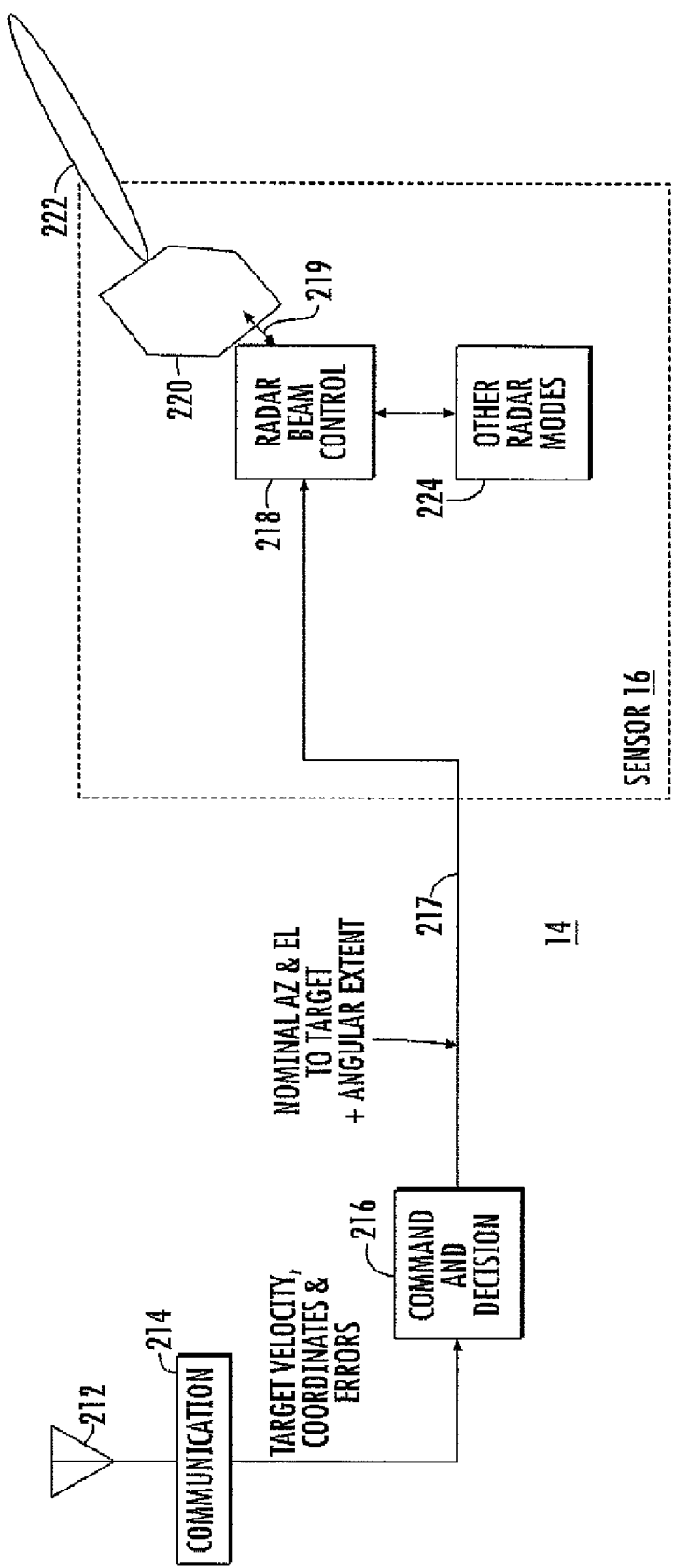
FIG. 2 is a simplified block diagram illustrating various shipboard functions relating to sensor acquisition of the target of FIG. 1.
Figure 5:
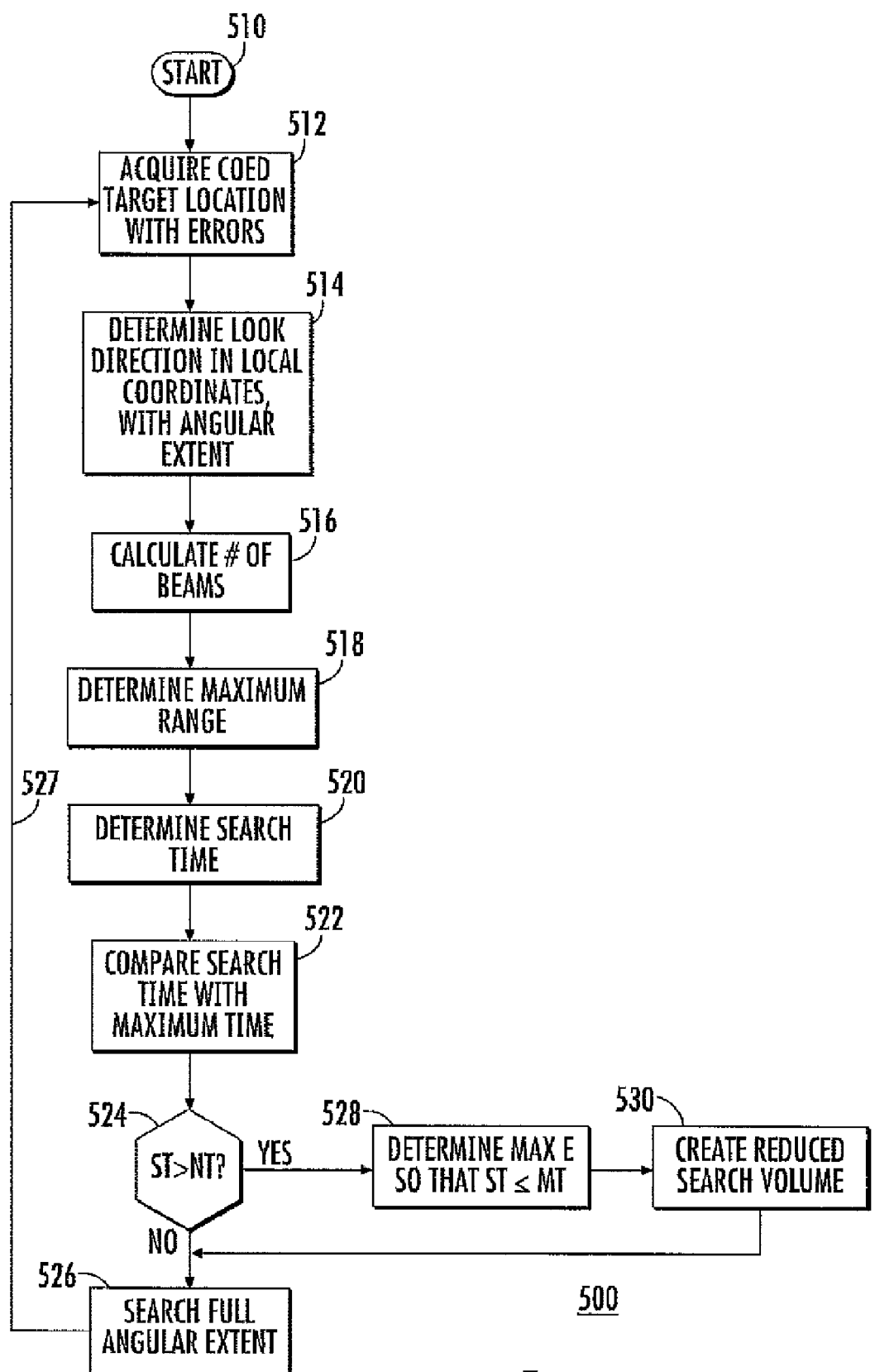
FIG. 5 is a flow chart illustrating steps according to the Friesel application.
Figure 6:
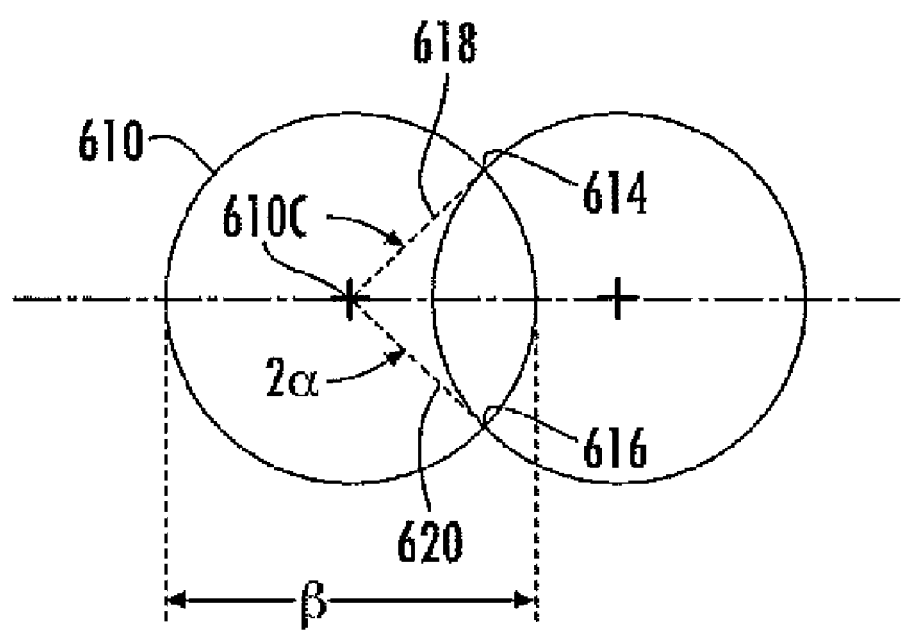
FIG. 6 illustrates geometry associated with two overlapping antenna beams.

FIG. 8 is a simplified logic flow chart or diagram, similar to that of FIG. 5, but which is modified according to an aspect of the invention. According to an aspect of the invention, in a step (a) the information which accompanies the cued direction received by antenna 212 and the communications 214 of FIG. 2 is processed by command and decision block 216 much as in the prior art. The three-dimensional (3-dimensional) covariance portion of the cue information may be viewed as being an ellipse, as described above, in which the major and minor axes may not be, and generally are not, aligned with the azimuth and elevation axes, respectively, of the radar. FIG. 7A illustrates a covariance ellipse 710 which has its major axis rotated by an angle γ from the azimuth direction. This error may cause an excessive number of beams to be used in the search mode. Step (a) is performed in logic block 810 and involves mathematically projecting the covariance ellipse onto the viewplane. The viewplane is defined as a two-dimensional surface normal to the range vector that extends from the radar to the nominal target position. Given a covariance matrix $$C = \begin{pmatrix} \sigma_1 & \sigma_4 & \sigma_6 \\ \sigma_4 & \sigma_2 & \sigma_5 \\ \sigma_6 & \sigma_5 & \sigma_3 \end{pmatrix},$$

the projection of the covariance onto the viewplane is designated A and is found by straightforward analysis to be $$A = \frac{1}{\sigma_2 \sigma_3 - \sigma_5^2} \begin{pmatrix} \sigma_3 & -\sigma_5 \\ -\sigma_5 & \sigma_2 \end{pmatrix} = \begin{pmatrix} a_{11} & a_{12} \\ a_{21} & a_{22} \end{pmatrix}$$

(where $a_{12}=a_{21}$).

A second step (b) is performed, according to an aspect of the invention, in additional logic block 812 of FIG. 8, and involves rotation of the projected covariance ellipse until the eigenvectors are parallel to the azimuth and elevation axes of the viewplane. FIG. 7B illustrates the ellipse of FIG. 7A rotated by angle γ in block 810 of FIG. 8, to bring the ellipse into registry with the azimuth and elevation directions. The eigenvalues $\lambda_1$ and $\lambda_2$ of A are found by standard calculation to be $$\lambda_1 = \frac{1}{2}\left[a_{11} + a_{22} + \sqrt{(a_{11} - a_{22})^2 + 4a_{12}^2}\right],$$
$$\lambda_2 = \frac{1}{2}\left[a_{11} + a_{22} - \sqrt{(a_{11} - a_{22})^2 + 4a_{12}^2}\right].$$

The angle of rotation γ to align $\lambda_1$ with the azimuth axis is found from e.g.

$$\gamma = -\frac{1}{2}\sin^{-1}\left(\frac{[2a_{12}]}{[\lambda_1 - \lambda_2]}\right).$$

The desired angle is γ (or equivalently the minor axis may be aligned with azimuth, using appropriate substitutions in the following processing) with respect to $\lambda_1$. In an example, the angle selected is γ, which is the angle between $\lambda_1$ and the azimuth axis. The extents used to determine the acquisition face are then $$Az_{ext} = \sqrt{\lambda_1}$$

in azimuth, and $$El_{ext} = \sqrt{\lambda_2}$$

in elevation.

Figure 1:
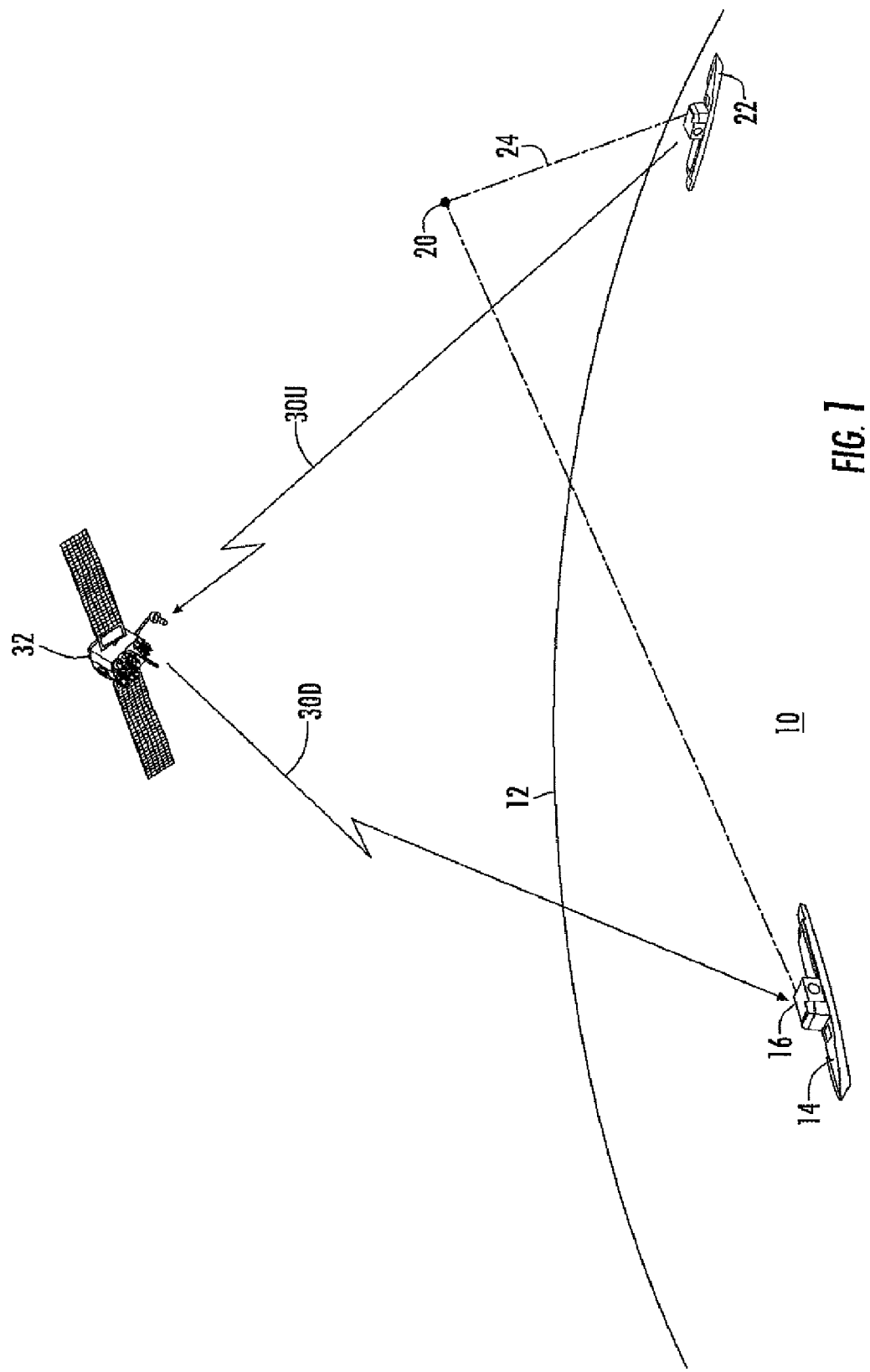
FIG. 1 is a simplified representation of a scenario in which a radar-equipped ship receives cue information relating to a target from a remote sensor as described in patent application Ser. No. 12/208,588, filed Sep. 11, 2008 in the name of Friesel.

Following the step performed in block 812 of FIG. 8, the extents are determined by any method. Logic 800 of FIG. 8 follows the same path as the logic 500 of FIG. 5 as to blocks 514, 516, 518, 520, 522, 524, 528, and 520, and is one example of the determination of extents. A block 812 interposed between the outputs of decision blocks 524 and 530 and block 526 represents undoing of the rotation imposed by block 812 on the acquisition face. Block 526 represents the searching of the full extent. Once the search of the full extent has begun, the logic can return by a logic path 527 from block 526 to block 512 to acquire new cue information for processing during the next scan. Once the extents are determined, they are communicated to the SPY radar system 16 of FIG. 1, ultimately for scheduling beams for filling the search face.

Following the determination of the acquisition face, (c) the acquisition parameters and rotation angle are sent to the search radar block 218, which determines the position of search beams as known in the art. The processing described above may reduce the number of beams required to search. It is necessary to rotate the projected ellipse back to the original position in order to obtain correct search beam placement.

According to an aspect of the invention, and before the radar physically creates the search beam and searches the designated area, the beam position is rotated about the center of the acquisition face by an angle equal to the inverse of the rotation angle determined in second step b) above.

Figure 9:
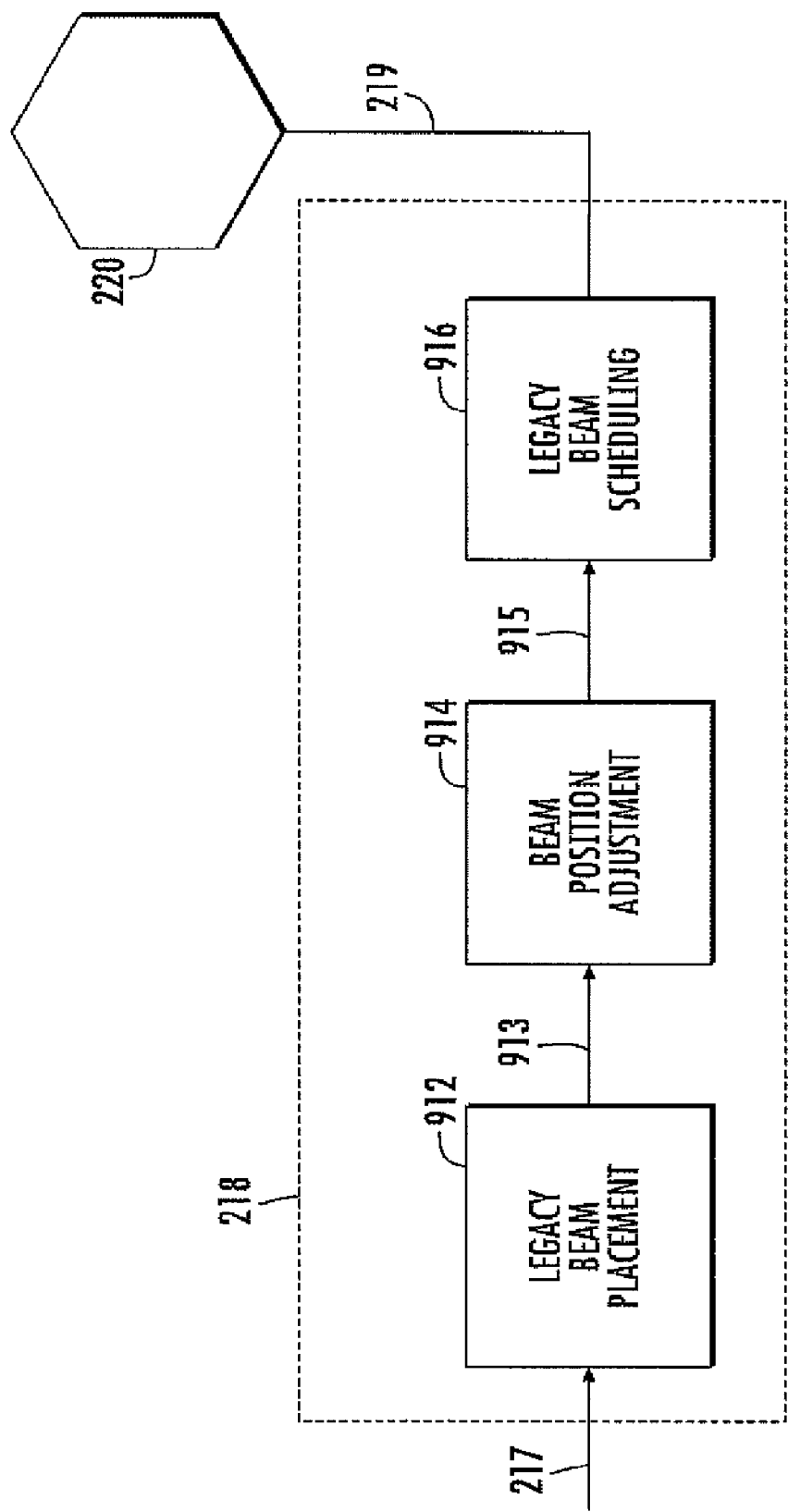
FIG. 9 is a simplified diagram setting forth some details of the sensor of FIG. 2, illustrating modifications useful in conjunction with the invention.

FIG. 9 illustrates the SPY radar system beam control portion (218 of FIG. 1) modified to return the covariance ellipse from the state illustrated in FIG. 7B resulting from principal axes alignment, to the original orientation illustrated in FIG. 7A. In FIG. 9, block 912 represents the legacy beam positioning portion of the SPY radar system, and block 916 represents the remaining legacy portion, which receives the beam positions and schedules their transmission to the antenna 220. A new block 914 is coupled between blocks 912 and 916, and represents additional logic which performs beam placement adjustment in order to accomplish the "rotation of the covariance ellipse". In FIG. 9, the information produced on path 913 by block 912 represents beam center positions and the angle γ of rotation of the ellipse. New block 914 performs the rotation, and produces on path 915 the new beam center positions. Block 916 performs the prior-art scheduling of beams.

Figure 3A:
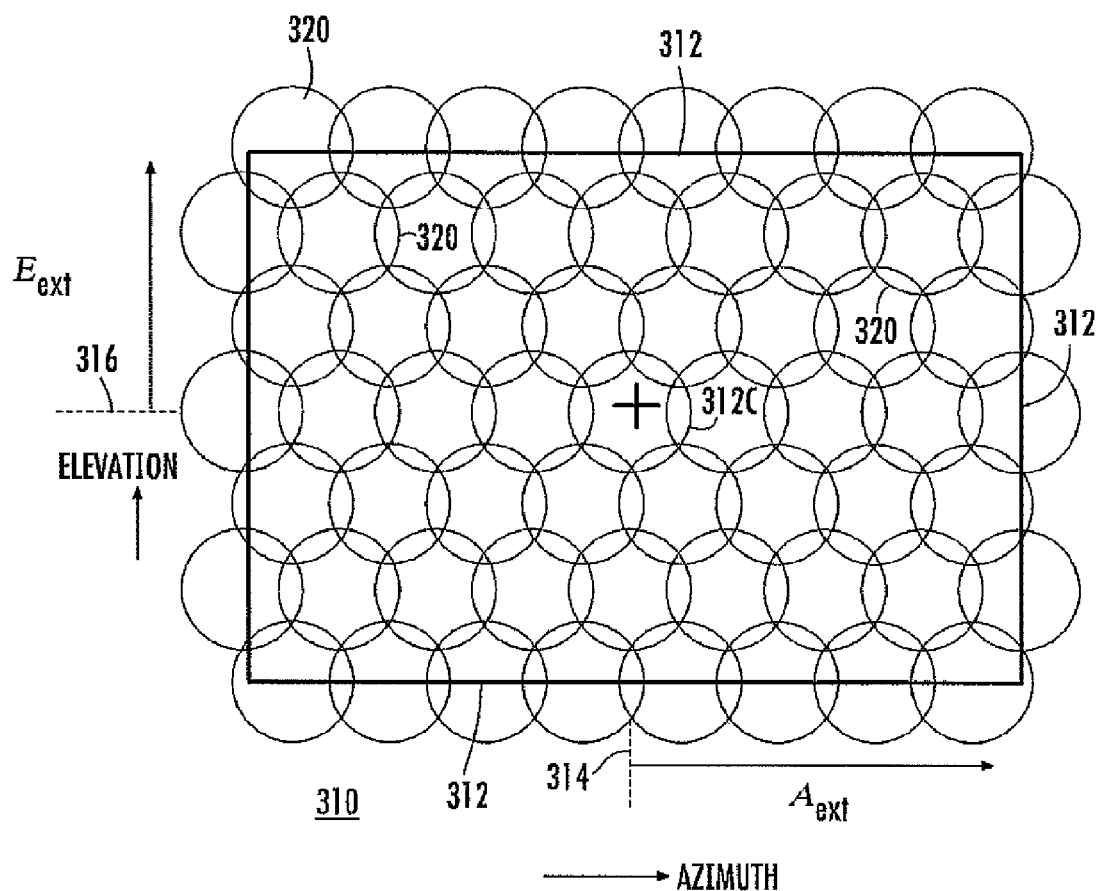
FIG. 3A is a view of a representative search face as described in the Friesel application.
Figure 3B:
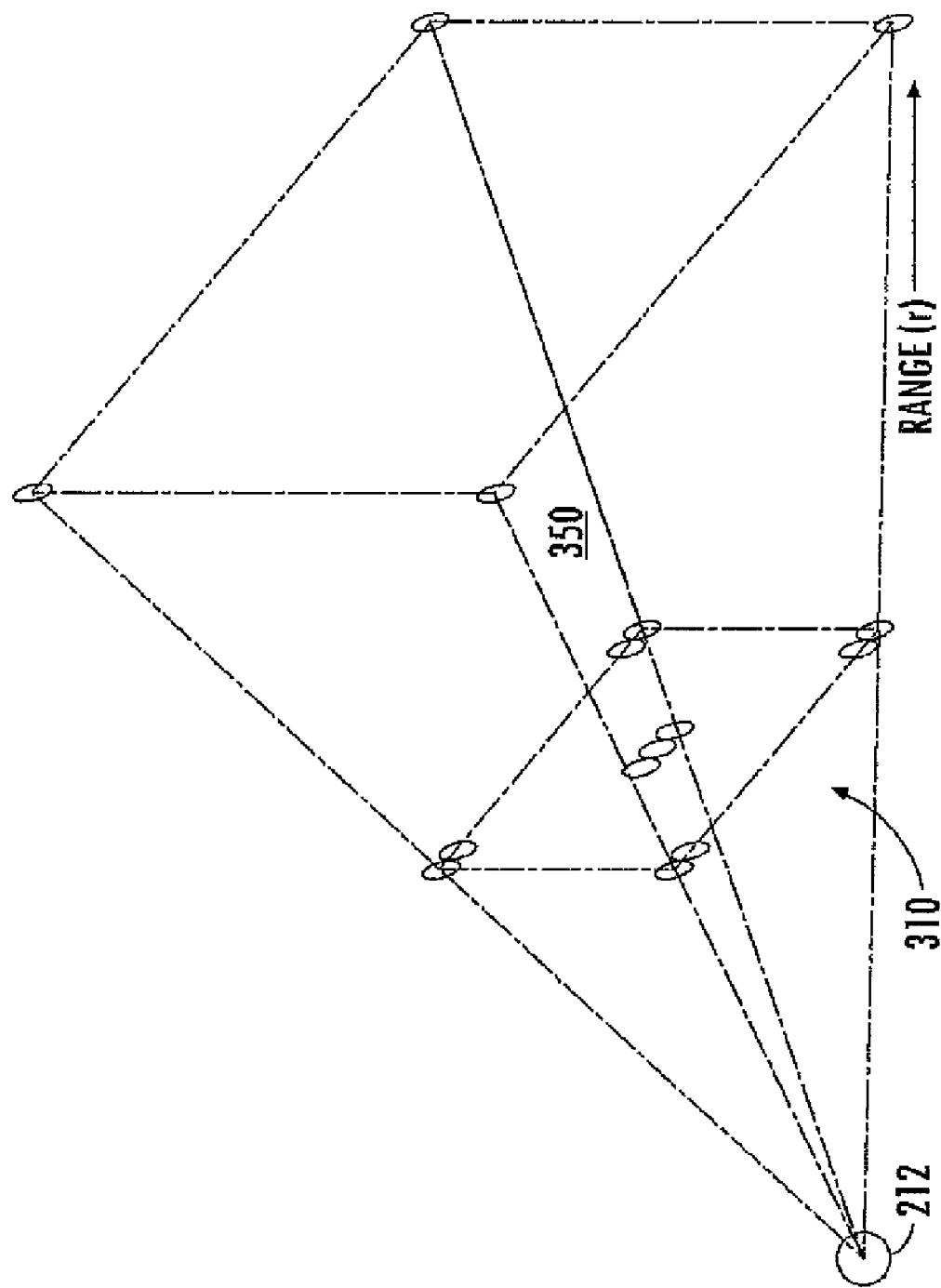
FIG. 3B is a representation of the search face of FIG. 3A with the addition of range as a parameter.
Figure 4:
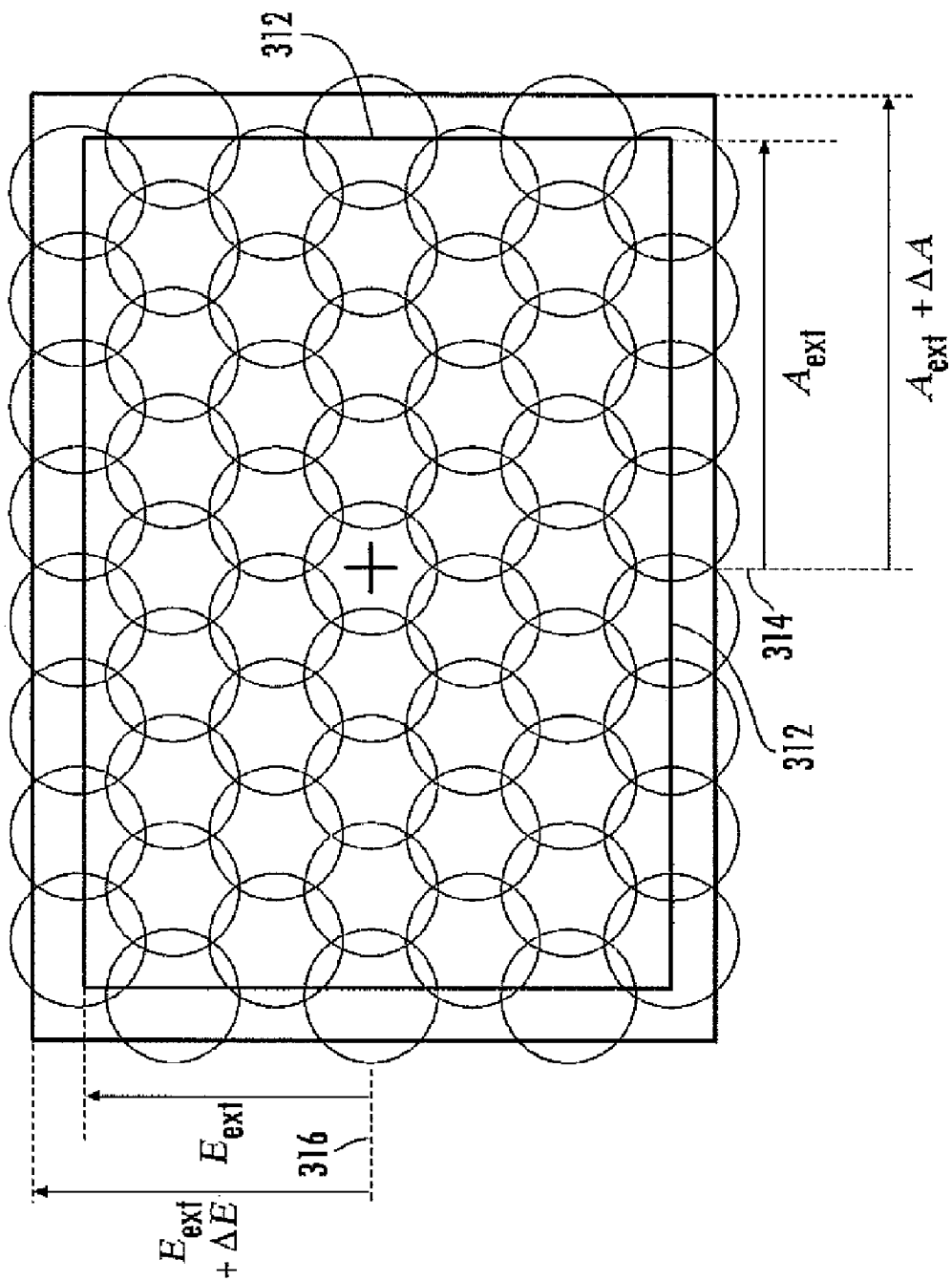
FIG. 4 is a view of the search face of FIG. 3A with additional boundaries.

Referring to FIG. 3A, the radar determines the location of a beam by a) determining the position of the center of the beam to be positioned relative to the center of the scan face, according to some pre-defined beam pattern or placement logic, b) determining if the beam center, defined by an azimuth az and elevation el, lies within the scan face, i.e. within the limits defined by the azimuth center minus the azimuth extent and the azimuth center plus the azimuth extent, and the elevation center minus the elevation extent and the elevation center plus the elevation extent. In FIG. 9 the above processing is carried out in block 912, and the resulting beam center and rotation angle γ are sent via path 913 to block 914. An aspect of the invention is to then rotate, in block 914, the center of the beam to be placed according to $$\begin{pmatrix} az_1 \\ el_1 \end{pmatrix} = \begin{pmatrix} \cos(\gamma) & \sin(\gamma) \\ -\sin(\gamma) & \cos(\gamma) \end{pmatrix} \begin{pmatrix} az \\ el \end{pmatrix}$$

where $$\gamma = -\frac{1}{2}\sin^{-1}\left(\frac{[2a_{12}]}{[\lambda_1 - \lambda_2]}\right).$$

The beam center, now positioned at azimuth $az_1$ and elevation $el_1$, is subsequently sent via path 915 to block 916 for scheduling. The process is then repeated until all of the N search beams have been scheduled.

Block 914 thus individually adjusts the beam positions, and sends the individual beams, with their locations adjusted in the acquisition face, on to block 916. Block 916 operates in a legacy mode to schedule the beams and send them to the antenna face.

The use of the invention reduces the number of beams required to search an acquisition volume. This, in turn, reduces the computer processing load and provides more radar resources for other radar functions.

Thus, a method according to an aspect of the invention is for searching an angular region of the radar (16) acquisition or search volume (310) about a given cued direction (+) and with a maximum range (r), where the radar search of the designated volume (310) is performed with sequentially applied radar beams (320) having defined beamwidths from a planar radar face (220). The method comprises the steps of acquiring (512) error information in the form of a covariance relating to the cued direction and projecting the covariance onto the viewplane of the radar, i.e. the plane normal to the radar range vector (710). The projected covariance is then rotated through an angle γ to align the principal axes of the projection (712) with the traverse/elevation axes of the viewplane (720), and determining the azimuth and elevation extent of the search volume about the cue direction (514). From the width of each beam, the number of beams required to cover the acquisition face of the search volume is determined (516). Dwell time for each of the beams is determined (520), given the search range (518). The product is taken of the number of beams multiplied by the dwell time per beam to thereby establish a search time, and the search time is compared with a maximum allowable search time (522). Radar scanning is initiated (915) over the acquisition face with the calculated number of beams if the search time is less than the maximum allowable search time. According to an aspect of the invention, after determining the position of each search beam, the position is rotated back through γ prior to scheduling and search (914). If the estimated search time is greater than the allowable search time, the search face is partitioned (530) into sub-search-faces if the search time is greater than the maximum allowable search time, and for each of the sub-search-faces, radar scanning is initiated (526). The step of determining the azimuth and elevation extent of the search volume about the cue direction (222) includes the step of projecting the covariance (810) onto the viewplane of the radar (220), and rotating the projected covariance to align the principal axes with the traverse/elevation axes of the radar plane. The step of initiating radar scanning over the acquisition face with the calculated number of beams if the search time is less than the maximum allowable search time (524) includes the step of rotating the eigenvectors of the projection of the covariance (812) to align the principle eigenvectors with the azimuth and elevation axes of the viewplane.

What is claimed is:

1. A method for searching an angular region of a search volume, said method comprising the steps of:
   acquiring error information relating to a cue direction;
   from said error information, determining azimuth and elevation extents of the search volume about the cue direction;
   determining an angular extent of each radar beam in azimuth and elevation;
   from said angular extents in azimuth and elevation for each radar beam, determining a number of beams for covering an acquisition face of said search volume;
   determining a dwell time for each of the radar beams given a search range;
   multiplying said number of beams by the dwell time per beam to establish a search time;
   comparing said search time with a maximum allowable search time;
   initiating radar scanning over said acquisition face if said search time is less that said maximum allowable search time; and
   partitioning said search face into sub-search-faces if said search time is greater than said maximum allowable search time, and for each of said sub-search-faces, initiating radar scanning;
   wherein said step of determining the azimuth and elevation extents of the search volume about the cue direction includes the step of projecting a covariance onto a viewplane of the radar, which viewplane is normal to a range vector of the radar.

2. A method according to claim 1, wherein said step of initiating radar scanning over said acquisition face includes the step of rotating eigenvectors of the projection of the covariance to align the principal axes of the projection with traverse and elevation axes of the viewplane.

3. A method for searching an angular region of a radar search volume, said method comprising the steps of:
   acquiring error information relating to a cue direction;
   from said error information, determining azimuth and elevation extents of the search volume about the cue direction;
   determining an angular extent of each of a plurality of radar beams in azimuth and elevation;
   from said angular extents in azimuth and elevation for each beam, determining a number of beams for covering an acquisition face of said search volume;
   determining a dwell time for each of the beams given a search range;
   multiplying said number of beams by the dwell time per beam to thereby establish a search time;
   comparing said search time with a maximum allowable search time;
   initiating radar scanning over said acquisition face if said search time is less that said maximum allowable search time; and
   partitioning said search face into sub-search-faces if said search time is greater than said maximum allowable search time, and for each of said sub-search-faces, initiating radar scanning;
   wherein said step of determining azimuth and elevation extents of the search volume about the cue direction includes the steps of:
     projecting a covariance as an ellipse onto a viewplane of the radar; and
     determining rotation angle, and rotating the projected covariance ellipse by the rotation angle, so that eigenvectors are parallel to azimuth and elevation axes of the viewplane.

4. A method according to claim 3, wherein said step of initiating radar scanning over said acquisition face includes the step of rotating each beam position through a negative of said rotation angle prior to scanning.

5. A method for searching an angular region of a radar search volume about a cued direction, said method comprising the steps of:
   acquiring error information relating to said cued direction;
   from said error information, determining azimuth and elevation extents of the search volume about the cue direction;
   determining an angular extent of each of a plurality of radar beams in azimuth and elevation;
   from said angular extents in azimuth and elevation for each beam, determining number of beams for covering an acquisition face of said search volume;
   determining a dwell time for each of the beams given a search range;
   multiplying said number of beams by the dwell time per beam to establish a search time;
   comparing said search time with a maximum allowable search time;
   initiating radar scanning over said acquisition face if said search time is less that said maximum allowable search time; and
   partitioning said search face into sub-search-faces if said search time is greater than said maximum allowable search time, and for each of said sub-search-faces, initiating radar scanning;
   wherein said step of determining azimuth and elevation extents of the search volume about the cue direction includes the steps of:
     a) projecting a covariance onto a viewplane of the radar, where said viewplane is in a plane normal to a radar range vector, to thereby generate a projected covariance; and
     b) determining a covariance rotation angle and rotating the projected covariance so that principal axes of the projected covariance are aligned with traverse/elevation axes of the viewplane; and wherein said step of initiating radar scanning over said acquisition face if said search time is less than said maximum allowable search time includes the steps of:
   c) sending the covariance rotation angle to the radar along with acquisition volume parameters; and
   d) rotating a search beam through a negative of the covariance rotation angle prior to scanning.

6. A method for searching an angular region of a search volume with sequentially applied radar beams, the method comprising:
   determining extents of the search volume about a cue direction;
   determining angular extents of each beam;
   from the angular extents of each beam, determining a number of beams required to cover an acquisition face of the search volume;
   determining a dwell time for each of the beams;
   determining a search time using the number of beams and the dwell time for each of the beams;
   comparing the search time with a maximum allowable search time; and
   initiating radar scanning over the acquisition face if the search time is less that the maximum allowable search time.

7. A method according to claim 6, further comprising:
   partitioning the acquisition face into sub-acquisition-faces if the search time is greater than the maximum allowable search time; and
   for each of the sub-acquisition-faces, initiating radar scanning.

8. A method according to claim 6, wherein said search volume encloses a target identified by a cooperating radar.

9. A method according to claim 6, wherein said search time is a product of the number of beams and the dwell time per beam.

10. A method according to claim 6, wherein the step of determining extents of the search volume about the cue direction includes projecting a covariance onto a viewplane of the radar, where said viewplane is in a plane normal to a radar range vector, to generate a projected covariance; and determining a covariance rotation angle and rotating the projected covariance so that principal axes of the projected covariance are aligned with traverse/elevation axes of the viewplane.

11. A method according to claim 6, wherein said step of initiating radar scanning over said acquisition face if said search time is less than said maximum allowable search time includes sending the covariance rotation angle to the radar along with acquisition volume parameters; and rotating a search beam through a negative of the covariance rotation angle prior to scanning.

12. A method according to claim 6, wherein said step of extents of the search volume comprises determining azimuth and elevation extents of the search volume.

13. A system for searching an angular region of a search volume with sequentially applied radar beams, the system comprising:
   a processor executing instructions for performing the steps of:
      determining extents of the search volume about a cue direction;
      determining angular extents of each beam;
      from the angular extents of each beam, determining a number of beams required to cover an acquisition face of the search volume;
      determining a dwell time for each of the beams;
      determining a search time using the number of beams and the dwell time for each of the beams;
      comparing the search time with a maximum allowable search time; and
      initiating radar scanning over the acquisition face with the determined number of beams if the search time is less that the maximum allowable search time.

14. A system according to claim 13, wherein the processor executes instructions for performing the further steps of:
   partitioning the acquisition face into sub-acquisition-faces if the search time is greater than the maximum allowable search time; and
   for each of the sub-acquisition-faces, initiating radar scanning.

15. A system according to claim 13, wherein said search volume encloses a target identified by a cooperating radar.

16. A system according to claim 13, wherein said search time is a product of the number of beams and the dwell time per beam.

17. A system according to claim 13, wherein the step of determining extents of the search volume about the cue direction includes projecting a covariance onto a viewplane of the radar, where said viewplane is in a plane normal to a radar range vector, to generate a projected covariance; and determining a covariance rotation angle and rotating the projected covariance so that principal axes of the projected covariance are aligned with traverse/elevation axes of the viewplane.

18. A system according to claim 13, wherein said step of initiating radar scanning over said acquisition face if said search time is less than said maximum allowable search time includes sending the covariance rotation angle to the radar along with acquisition volume parameters; and rotating a search beam through a negative of the covariance rotation angle prior to scanning.

19. A system according to claim 13, wherein said step of extents of the search volume comprises determining azimuth and elevation extents of the search volume.

\* \* \* \* \*